(12) United States Patent
Bober et al.

(10) Patent No.: US 8,515,158 B2
(45) Date of Patent: Aug. 20, 2013

(54) ENHANCED IMAGE IDENTIFICATION

(75) Inventors: Miroslaw Bober, Guildford (GB); Paul Brasnett, Surbiton (GB)

(73) Assignee: Mitsubishi Electric Corporation, Tokyo (JP)

( * ) Notice: Subject to any disclaimer, the term of this patent is extended or adjusted under 35 U.S.C. 154(b) by 580 days.

(21) Appl. No.: 12/680,371

(22) PCT Filed: Jun. 30, 2008

(86) PCT No.: PCT/GB2008/002251
§ 371 (c)(1),
(2), (4) Date: May 17, 2010

(87) PCT Pub. No.: WO2009/047471
PCT Pub. Date: Apr. 16, 2009

(65) Prior Publication Data
US 2010/0310153 A1    Dec. 9, 2010

(30) Foreign Application Priority Data

Oct. 10, 2007 (GB) .................................. 0719833.6

(51) Int. Cl.
*G06K 9/00*   (2006.01)
(52) U.S. Cl.
USPC .......................................... 382/154; 382/100
(58) Field of Classification Search
USPC ....................................................... 382/154
See application file for complete search history.

(56) References Cited

U.S. PATENT DOCUMENTS 6,421,463 B1 *   7/2002   Poggio et al. ................. 382/224
2003/0036855 A1 *   2/2003   Harris et al. .................... 702/19

FOREIGN PATENT DOCUMENTS

| EP | 1 912 160 | 4/2008 |
| JP | 2001-67462 | 3/2001 |
| JP | 2003-271177 | 9/2003 |
| JP | 2005-208979 | 8/2005 |
| WO | WO 01/04842 A1 | 1/2001 |
| WO | WO 2008/084185 | 7/2008 |
| WO | WO 09/001025 | 12/2008 |

OTHER PUBLICATIONS

Daras et al, "Shape Matching Using the 3D Radon Transform", 2004, IEEE, pp. 953-960.*
Smith et al, "Radon transform and bandwidth compression", Jul. 1983, Optics Letter, vol. 8, No. 7, 395-397.*

(Continued)

*Primary Examiner* — Edward Park
(74) *Attorney, Agent, or Firm* — Birch, Stewart, Kolasch & Birch, LLP.

(57) ABSTRACT

A method for deriving a representation of an image is described. The method involves processing signals corresponding to the image. A three dimensional representation of the image is derived. The three dimensional representation of the image to used to derive the representation of the image. In one embodiment, each line of the image is defined by a first parameter (d) and a second parameter (θ), and a position on each line is defined by a third parameter (t), and the three dimensional representation is parameterized by the first, second and third parameters. A set of values is extracted from the three dimensional representation at a value of the first parameter, and a functional is applied along lines, or parts of lines, of the extracted set of values, the lines extending along values of the second or third parameter.

23 Claims, 4 Drawing Sheets

(56) References Cited

OTHER PUBLICATIONS

Masek, "Recognition of Human Iris Patterns for Biometric Identification", 2003, University of Western Australia, pp. i-56.*

Yanna et al., "Common Color Space and Its Conversions in Image Processing", Institute of Laser Science and Technology, Dec. 31, 2006, 4 pages.

Hidehito Nakagawa, et al. "Location Identification from Omnidirectional Images" IPSJ SIG Technical Report, vol. 2007 No. 42, 2007-CVIM-159, Computer Vision and Image Media, Information Processing Society of Japan, May 14, 2007, vol. 2007, No. 42, pp. 65-72, 2007-00763-006.

Hisakazu Maniwa, et al. "A Ship Wake Detection Method Using the Sum and the Square Sum of Amplitude in SAR Images" Journal of IEICE (J83-B) vol. 1, The Institute of Electronics, Information and Cummunication Engineers, Jan. 25, 2000, vol. J83-B, No. 1, pp. 96-105, 2001-00692-012.

Junichiro Toriwaki, "Digital Image Processing for Image Recognition (1)", Shokodo Co., Ltd, Oct. 20, 1996, pp. 89-94, 1997-00019-001.

Turan et al., "Trace Transform and KLT Based Invariant Features and Image Recognition System," Acta Electrotechnica et Informatica, No. 3, vol. 6, 2006, 11 pages, XP-002411465.

"A Robust Image Fingerprinting System Using the Radon Transform", Apr. 1, 2004, Signal Processing Image Communication, Elsevier Science Publishers, Amsterdam, NL, pp. 325-339, XP004495308, ISSN: 0923-5965.

"Detection of Linear Features Using a Localized Radon Transform", Nov. 3, 1996, Signals, Systems and Computers, 1996, Conference Record of the Thirtieth Asilomar Conference on Pacific Grove, CA, USA Nov. 3-6, 1996, Los Alamitos, CA, USA, IEEE Comput. Soc, US, pp. 1245-1249, XP010231346.

"Efficient 3-D Model Search and Retrieval Using Generalized 3-D Radon Transforms", IEEE Trans. on Multimedia, vol. 8, No. 1, Feb. 2006, pp. 101-114, XP002497466.

"Localized Radon Transform-Based Detection of Ship Wakes in SAR Images", Jan. 1, 1995, IEEE Transactions on Geoscience and Remote Sensing, IEEE Service Center, Piscataway, NJ, US, pp. 35-45, XP000500450, ISSN: 0196-2892.

"The Trace Transform and Its Applications", IEEE Trans. PAMI, 23 (8), Aug. 2001, pp. 811-828.

Brasnett et al., "A Robust Visual Identifier Using the Trace Transform", Proc. of IET Visual Information Engineering Conference (VIE), Jul. 2007.

* cited by examiner

ENHANCED IMAGE IDENTIFICATION

BACKGROUND TO THE INVENTION

The present invention relates to a method and apparatus for representing an image, and, in addition, a method and apparatus for comparing or matching images, for example, for the purposes of searching or validation.

PROBLEMS ADDRESSED BY THE INVENTION

This invention relates to a new method of extracting features from the trace transform of an image which offers improvements to the image identification method and apparatus described in co-pending European patent application EP 06255239.3 and co-pending UK patent applications GB 0700468.2 and GB 0712388.8. The contents of EP 06255239.3, GB 0700468.2 and GB 0712388.8 are incorporated herein by reference, and details of the inventions and embodiments described therein apply analogously to the present invention and embodiments.

Figure 2:
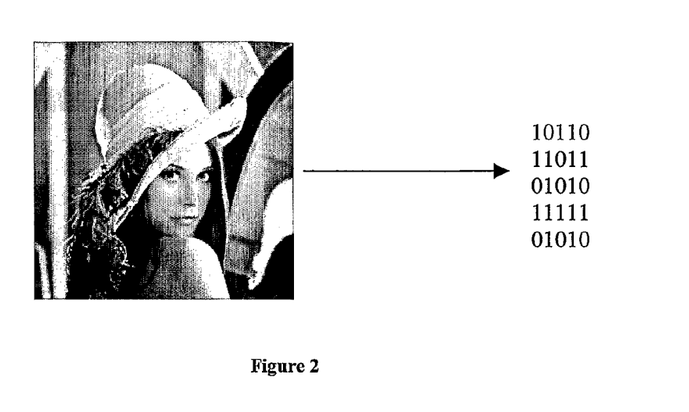
FIG. 2 shows an image and a bit string representation of the image according to the prior art.

Each of the image identification methods and apparatuses described in EP 06255239.3, GB 0700468.2 and GB 0712388.8, which extract a short binary descriptor from an image (see FIG. 2), address many drawbacks of the prior art, and in particular are characterised by:
 reduced computational complexity for both feature extraction and matching,
 reduced image descriptor size,
 increased robustness to various image modifications, and
 reduced false alarm rate to 0.1 ppm level while typically maintaining detection rate of 99.8% for a wide range of image modifications.

However, in practical applications it is desirable for the false alarm rate to be lower than 0.1 ppm and for the detection rates to be maintained at or above 99.8%. It is also desirable to maintain this level of performance under more difficult test conditions, including complex image modifications.

SUMMARY OF THE INVENTION

In accordance with a first aspect, the present invention provides a method for deriving a representation of an image as defined in accompanying claim 1 or claim 21.

In accordance with a second aspect, the present invention provides a method for comparing images, for example for image matching, by comparing representations of images derived in accordance with the first aspect of the present invention.

Other aspects of the present invention include use of image representations derived in accordance with the first aspect of the present invention, an apparatus and a computer program for performing a method in accordance with the first and/or second aspect of the present invention.

The present invention concerns a new method of extracting features from the trace transform of an image (or an equivalent two dimensional function of the image). As well known in the art, the trace transform projects all possible lines over an image, and this representation was used in the techniques disclosed in patent applications EP 06255239.3, GB 0700468.2 and GB 0712388.8.

The described embodiment of the present invention extends the prior work by extracting circular information from an image. This circular information can be extracted very efficiently at the same time as the Trace transform is performed.

In EP 06255239.3, GB 0700468.2 and GB 0712388.8 the Trace transform is computed by tracing an image with straight lines along which certain functional T of the image intensity or colour function are calculated. A functional is a real-valued function on a vector space V, usually of functions. In the case of the trace transform the functionals are applied over lines in the image. Different functionals T are used to produce different trace transforms from a given input image. Since in the 2D plane a line is characterised by two parameters the angle θ and distance d, a trace transform of the image is a 2D function of the parameters of each tracing line. Next, the circus function is computed by applying a diametrical functional P along the distance parameter of the trace transform.

In EP 06255239.3 a component binary identifier is constructed by computing the frequency representation of the circus function (e.g. by a Fourier transform) and taking a sign of a certain function defined on the frequency amplitude components (e.g. the function could be the difference in magnitudes of any two neighbouring frequency amplitudes).

In GB 0700468.2, the image is additionally traced with strips and/or double cones. Strips of different width and/or cones of different opening angle are used to obtain a multi-resolution representation of the trace transform and therefore the circus function. From each circus function, binary identifiers are extracted as in EP 06255239.3. In GB 0712388.8 spatially limited regions (bands) in the trace domain are used to compute the circus function, these spatially limited regions correspond to cones in the image domain. Again a component binary identifier is constructed by computing the frequency representation. The identifier is obtained by combining into a single descriptor selected string fragments from a 'family' of component identifiers obtained by using different functionals with strips and/or double cones and/or with different spatially limited bands.

BRIEF DESCRIPTION OF THE DRAWINGS

Embodiments of the invention will be described with reference to the accompanying drawings, of which:
FIG. 1a shows an image;
FIG. 1b shows a reduced version of the image of FIG. 1a;
FIG. 1c shows a rotated version of the image of FIG. 1a;
FIG. 1d shows a blurred version of the image of FIG. 1a;
FIG. 1e shows a flipped (left-right) version of the image of FIG. 1a;
FIG. 1f shows a heavily compressed version of the image of FIG. 1a;
FIG. 1g shows a cropped version of the image of FIG. 1a.

DETAILED DESCRIPTION OF THE EMBODIMENTS

Various embodiments for deriving a representation of an image, specifically an image identifier, and for using such a representation/identifier for the purposes of, for example, identification, matching or validation of an image or images, will be described below. The present invention is especially useful for, but is not restricted to, identifying an image. In the described embodiments, an "image identifier" (or simply "identifier") is an example of a representation of an image and the term is used merely to denote a representation of an image, or descriptor.

The skilled person will appreciate that the specific design details of an image identification apparatus and method, according to an embodiment of the invention, and the derivation of an image identifier for use in image identification, is determined by the requirements related to the type of image modifications it should be robust to, the size of the identifier, extraction and matching complexity, target false-alarm rate, etc.

In embodiments, the present invention comprises (i) an extension of the trace transform to 3 dimensions (referred to herein as "trace-cube"), (ii) a new class of efficient circular image features, (iii) a method of feature extraction from the trace-cube and (iv) a method of feature matching. According to one aspect of the invention, when performing a trace transform of an image, a 3D representation of the image is obtained by introducing an additional parameter t representing the position along the trace lines, in addition to parameters d, θ conventionally used in the trace transform. According to another aspect of the invention, a slice is taken from the 3-dimensional structure to generate an intermediate representation, i.e. an extracted set of values of the 3-dimensional structure. According to a further aspect of the invention, a slice is taken at d=0 and two types of circular information are extracted and used to create an identifier.

The following example illustrates a generic design that results in an identifier that is robust to the following modifications to an image (this is not an exhaustive list):
  Colour reduction,
  Blurring,
  Brightness Change,
  Flip (left-right & top-bottom),
  Greyscale Conversion,
  Histogram Equalisation,
  JPEG Compression,
  Noise,
  Rotation,
  Cropping and
  Scaling.

It has been found that this generic design can achieve a very low false-alarm rate of less than 0.05 parts per million (ppm) on a broad class of images and detection rates are typically above 99.7%.

Figure 1:
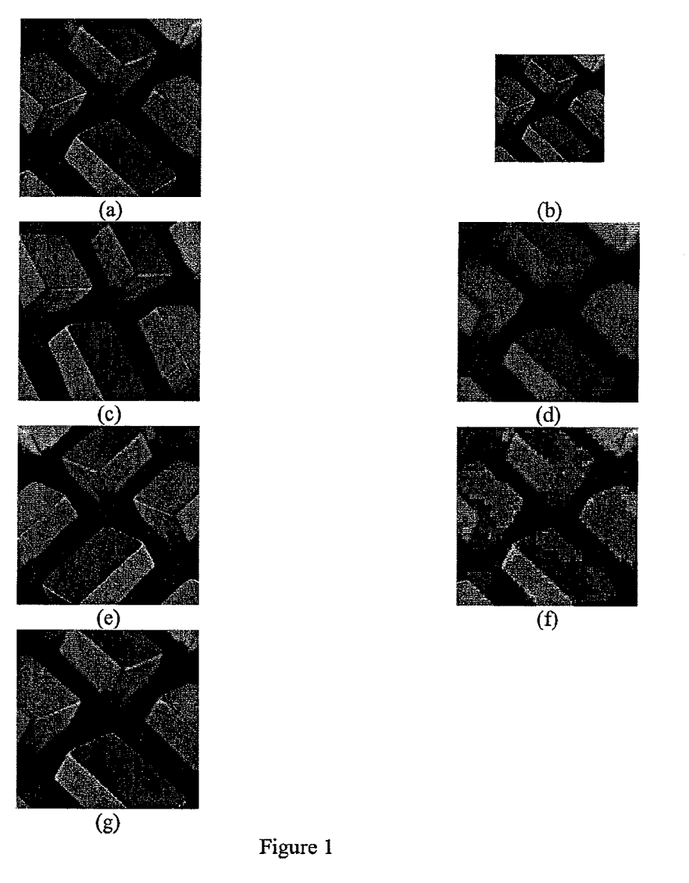

FIG. 1 shows an example of an image and modified versions of the image. More specifically, FIG. 1a is an original image, FIG. 1b is a reduced version of the image of FIG. 1a, FIG. 1c is a rotated version of the image of FIG. 1a, FIG. 1d is a blurred version of the image of FIG. 1a, FIG. 1e is a flipped version of the image of FIG. 1a, FIG. 1f is a compressed version of the image of FIG. 1a and FIG. 1g is a cropped version of the image of FIG. 1a.

An embodiment of the invention derives a representation of an image, and more specifically, an image identifier, by processing signals corresponding to the image.

In the initial stage of extraction the image is optionally pre-processed by resizing and filtering. The resizing step is used to normalise the images before processing. The filtering step can comprise of filtering to remove effects such as aliasing it can also include region selection and tapering. In the preferred embodiment the image is resized to a resolution of 192×N or N×192, where N≧192 and preserving the aspect ratio. In another embodiment the image is resized to a square of 192×192. The image is then low pass filtered with a 3×3 Gaussian kernel. A circular region is extracted from the centre of the image for further processing. For some transformations, the performance is improved by using a tapered edge when extracting the circular centre region. The preferred embodiment uses a taper size of 7 pixels. The pre-processing steps are optional and can include any combination of the above. Alternative values may be used, for example different image resizing or different Gaussian kernel sizes.

Figure 4:
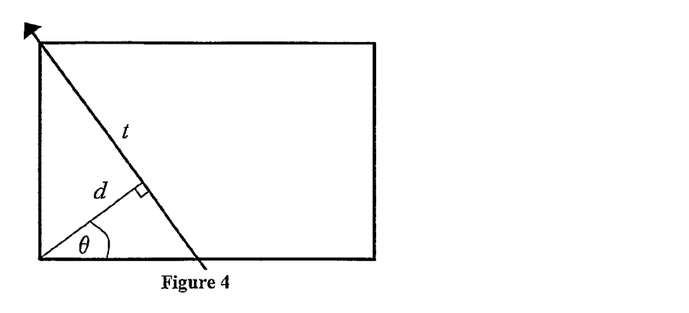
FIG. 4 is a diagram illustrating the line parameterisation for the trace transform.

The trace transform projects all possible lines over an image and applies functionals over these lines. A functional is a real-valued function on a vector space V, usually of functions. In the case of the trace transform a functional is applied over lines in the image. As shown in FIG. 4, a line is parameterised by distance d and angle θ and positions on the line by t. A further functional can be applied to the columns of the trace transform to give a vector of real numbers. This second functional is known as the diametrical functional and the resulting vector is known as the circus function. A third functional, the circus functional, can be applied to the circus function to give a single number. The properties of the result can be controlled by appropriate choices of the three different functionals (trace, diametrical and circus). Full details of the trace transform, including examples of images and corresponding trace transforms, can be found, for example, in reference [1] infra, incorporated herein by reference.

Figure 5:
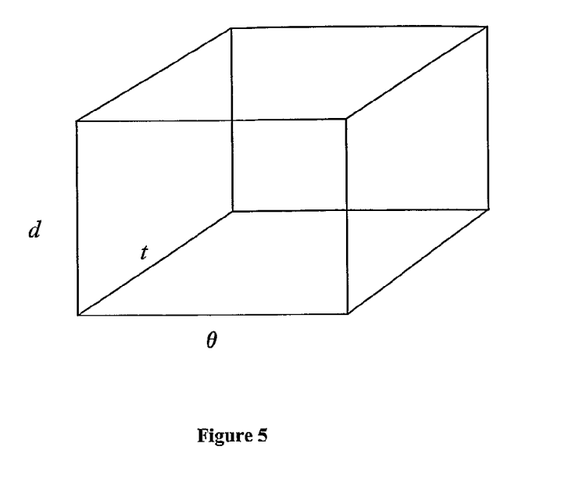
FIG. 5 shows a 3D representation of the image in terms of the angle θ, distance d and position on the line t, referred to herein as the "trace-cube"

Although the Trace transform is concerned with extracting lines from an image it is possible to extend the concept of the Trace transform and its extraction process to efficiently extract some circular information from an image. According to the present invention, a 3D representation of the image is generated in terms of the parameters d, θ and t as shown in FIG. 5. This new representation, which is a 3D volume, is referred to herein as the "Trace-cube". Trace-cube carries significantly more information then the conventional Trace transform, including information related to non-linear regions in the image, such as circles or ellipses. According to one embodiment of the present invention, a slice is taken from the Trace-cube at d=0 location, which allows two types of circular information to be extracted.

Figure 6:
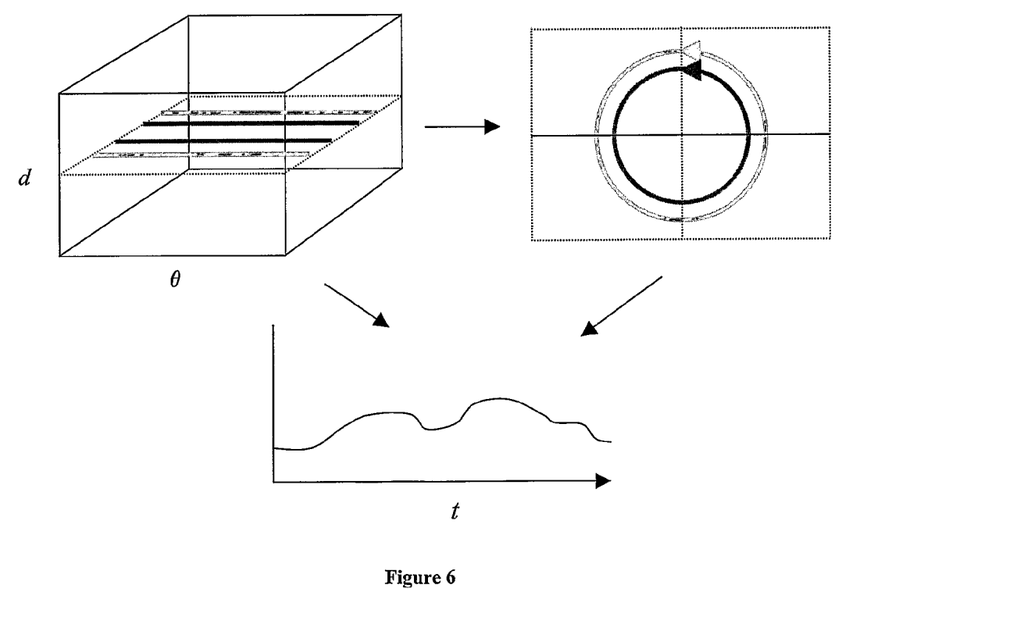
FIG. 6 shows how information can be extracted from the trace-cube that is equivalent to circular information in the image domain, by applying functionals along the lines in θ to obtain information about circles in the image; the 1D trace-circular function is in terms of the position on the line t which corresponds to the radius of the circle.

The extraction process of the first type of information, shown in FIG. 6, applies functionals along the θ parameter, which is equivalent to applying the functional around circles in the image domain. The result is a one dimensional function in terms of the position on the line t, in this case t is related to the radius of the circle. Herein, this function is referred to as the trace-circular.

Figure 7:
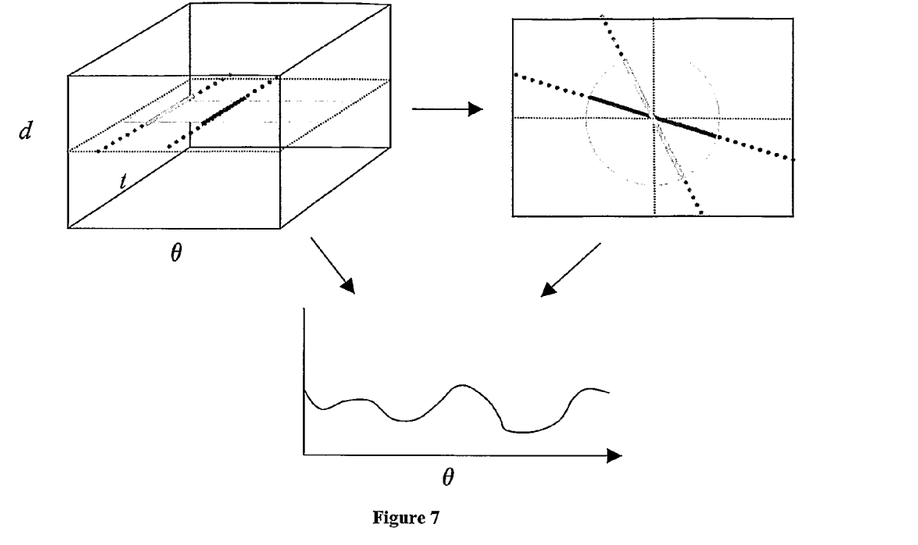
FIG. 7 show further circular information that can be obtained from the trace-cube, by applying functionals along intervals in the line position t it is possible to obtain information about circular bands in the image.

The second type of circular information concerns circular regions in the image domain as shown in FIG. 7. By applying a functional over only part of the line in an interval $t_0 \leq |t| \leq t_1$ we obtain a one dimensional signal in terms of the angle θ. Although FIG. 7 shows $t_0=0$, this is not necessary, taking a larger value $t_0>0$, would give an annulus. An annulus is made up of two concentric circles. The values of $t_0$ and $t_1$ define the radius of the concentric circles. This function will be referred to as the trace-annulus.

In practice with discrete data d=0 may not be available, in this instance two slices can be used that correspond to +/−Δd. These two slices are combined by, for example, adding the resulting trace-circular or trace annulus functions together for the two slices.

In one particular example of the method the functional is given by $$\int \xi(t) dt, \qquad (1)$$

However, as any person skilled in the art appreciates, other types of functionals can be used, depending on the specific requirements of the application.

The trace-annulus and trace-circular functions extracted according to this invention are then converted into binary identifiers, using a method similar to the one described in patent applications EP 06255239.3, GB 0700468.2 and GB 0712388.8, and described below for completeness.

For many image modification operations listed above with a suitable choice of functional the trace-annulus or trace-circular function $f(a)$ of image a is only ever a shifted or scaled (in amplitude) version of the function $f(a')$ of the modified image a'

$$f(a') = \kappa f(a-\theta). \qquad (2)$$

Now, by taking the Fourier transform of equation 2 we get $$F(\Phi) = F[\kappa f(a-\theta)], \qquad (3)$$

$$= \kappa F[f(a-\theta)], \qquad (4)$$

$$= \kappa \exp^{-j\theta\Phi} F[f(a)]. \qquad (5)$$

Then taking the magnitude of equation 5 gives $$|F(\Phi)| = |\kappa F[f(a)]|. \qquad (6)$$

From equation 6 we can see that the modified image and original image are now equivalent except for the scaling factor κ.

Figure 3:
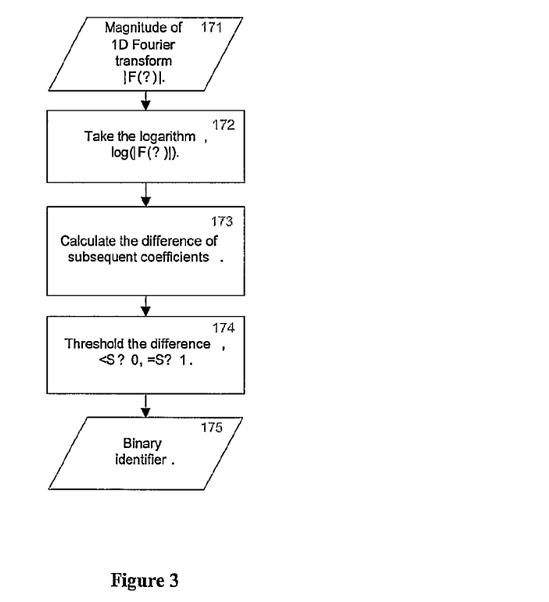
FIG. 3 is a diagram illustrating extraction of the binary identifier.

FIG. 3 shows a method of defining a binary function on Fourier transform coefficients. In particular, after obtaining Fourier transform harmonics in step 171, the logarithm of the magnitude of a plurality of Fourier transform harmonics is obtained in step 172.

According to the embodiment, in step 173 a function $c(\omega)$ is now defined on the magnitude coefficients of a plurality of Fourier transform harmonics. One illustration of this function is taking the difference of the magnitude of neighbouring harmonics $$c(\omega) = |F(\omega)| - |F(\omega+1)| \qquad (7)$$

A binary string can be extracted in step 174 by applying a threshold to the resulting vector (equation 7) such that $$b_\omega = \begin{cases} 0, & c(\omega) < S \\ 1, & c(\omega) \geq S \end{cases} \text{ for all } \omega. \qquad (8)$$

Suitable choices for S include S=0 and S=mean(c). The output image identifier (step 175) is then made up of these values $B = \{b_0, \ldots, b_n\}$.

To perform identifier matching between two different identifiers $B_1$ and $B_2$ both of length N, the normalised Hamming distance is taken $$H(B_1, B_2) = \frac{1}{N} \sum_N B_1 \otimes B_2, \qquad (9)$$

where ⊗ is the exclusive OR (XOR) operator. Alternatively, because various components (sub-sets of bits) in the identifier carry independent information, a scalable identifier structure and scalable matching can be deployed. The entire identifier of N bits can be divided into S non-overlapping (disjoint) subsets of bits $\{B^1, B^2, \ldots, B^S\}$.

The matching can then performed on a selected subsets, depending on the performance required or computational/memory/transmission resources available for the application.

In the preferred implementation, N=512 and 4 subsets based on required performance are selected each of 128 bits. Matching with subset $B^1$ typically delivers 98.82% detection rate with subset $B^1 \cup B^2$ giving 99.60%, $B^1 \cup B^2$ and $B^1 \cup B^2 \cup B^3$ 99.69%. The entire set N has typical performance of 99.72%.

As a person skilled in the art appreciates, the number of sets and their composition depends on the requirements of the application. Further it should be noted that particular subsets may be chosen to provide robustness to particular modifications. Other methods of comparing identifiers or representations can be used.

The performance is further improved by selection of certain bits in the identifier. The bits corresponding to the lower frequencies in the frequency transform are generally more robust and the higher bits are more discriminating. In one particular embodiment of the invention the first bit, $b_0$ which corresponds to the DC component, is ignored and then the identifier is made up of the next 48 bits.

In a preferred embodiment the bits extracted from the circular information as described in this invention are combined with the bits extracted as described in one or more of EP 06255239.3, GB 0700468.2 and GB 0712388.8. Without the circular information of this invention the best performance is obtained using the preferred embodiment of GB 0712388.8, the performance at a false detection rate of 0.05 parts per million is 98.9, with the addition of the circle information as described in this invention the performance is typically increased to above 99.7%.

In the preferred embodiment 17 basic identifiers are extracted from the image as described in GB 0712388.8. Additionally one identifier is extracted from the trace-circular function and three identifier are extracted from three trace-annulus functions. The trace annulus functions correspond to annuli with increasing radii.

Figure 8:
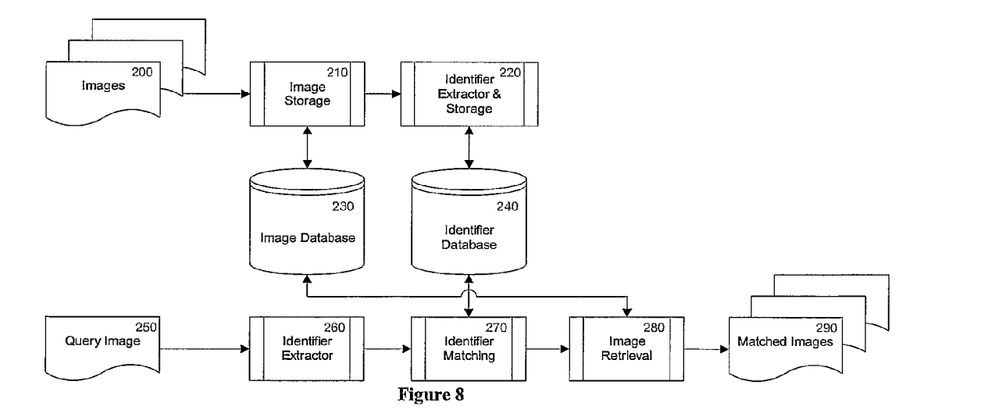
FIG. 8 is a block diagram of an apparatus according to an embodiment of the invention.

An example of an apparatus for an application of the invention according to an embodiment of the invention for carrying the above methods is shown in FIG. 8. The application involves building a database of identifiers 240 for images stored in a database 230. The two databases 230 and 240 may be the same or separated databases. The apparatus allows searching for the identifier 260 extracted from a query image 250 to find matches in the database. A, possibly ordered, list of images is returned to the user 290 or query application.

Alternative Implementations

In the preferred embodiment a slice is taken from the trace-cube at d=0. Alternatively slices may be taken at d≠0, the information in this slice corresponds to ellipses in the image domain rather than circles.

The identifiers derived from the trace-annulus and trace-circular functions are preferably combined with the identifiers described in EP 06255239.3, GB 0700468.2 and GB 0712388.8. However, the combination is not fundamental and good identification performance may be obtained by using only the trace-annulus and/or trace-circular functions.

Alternative Applications

The identifier can also be used to index the frames in a video sequence. Given a new sequence identifiers can be extracted from the frames and then searching can be performed to find the same sequence. This could be useful for copyright detection and sequence identification.

Multiple broadcasters often transmit the same content, for example advertisements or stock news footage. The identifier can be used to form links between the content for navigation between broadcasters.

Image identifiers provide the opportunity to link content through images. If a user is interested in a particular image on a web page then there is no effective way of finding other pages with the same image. The identifier could be used to provide a navigation route between images.

The identifier can be used to detect adverts in broadcast feeds. This can be used to provide automated monitoring for advertisers to track their campaigns.

There are many image databases in existence, from large commercial sets to small collections on a personal computer. Unless the databases are tightly controlled there will usually be duplicates of images in the sets, which requires unnecessary extra storage. The identifier can be used as a tool for removing or linking duplicate images in these datasets.

Upon receiving a poor quality, possibly heavily compressed, image a user may wish to find a higher quality version. The identifier may be used to search a database or the interne for a high resolution version.

In this specification, the term "image" is used to describe an image unit, including after processing, such as filtering, changing resolution, upsampling, downsampling, but the term also applies to other similar terminology such as frame, field, picture, or sub-units or regions of an image, frame etc. In the specification, the term image means a whole image or a region of an image, except where apparent from the context. Similarly, a region of an image can mean the whole image. An image includes a frame or a field, and relates to a still image or an image in a sequence of images such as a film or video, or in a related group of images. The image may be a greyscale or colour image, or another type of multi-spectral image, for example, IR, UV or other electromagnetic image, or an acoustic image etc.

In the described embodiments, a frequency representation is derived using a Fourier transform, but a frequency representation can also be derived using other techniques such as a Haar transform. Moreover, the term Fourier transform is intended to cover variants such as DFT and FFT.

The invention is preferably implemented by processing electrical signals using a suitable apparatus.

The invention can be implemented for example in a computer system, with suitable software and/or hardware modifications. For example, the invention can be implemented using a computer or similar having control or processing means such as a processor or control device, data storage means, including image storage means, such as memory, magnetic storage, CD, DVD etc, data output means such as a display or monitor or printer, data input means such as a keyboard, and image input means such as a scanner, or any combination of such components together with additional components. Aspects of the invention can be provided in software and/or hardware form, or in an application-specific apparatus or application-specific modules can be provided, such as chips. Components of a system in an apparatus according to an embodiment of the invention may be provided remotely from other components, for example, over the internet.

As the skilled person will appreciate, many variations and modifications may be made to the described embodiments. For example, whilst the described embodiments produce a three dimensional representation of the image by extending the concept of the Trace transform, other techniques can be used to represent an image in three dimensions. Moreover, other techniques for deriving non-linear information such as circular or elliptical information may be used. It is intended to include all such variations, modification and equivalents that fall within the spirit and scope of the present invention.

REFERENCES

[1] Alexander Kadyrov and Maria Petrou, "The Trace Transform and Its Applications", IEEE Trans. PAMI, 23 (8), August, 2001, pp 811-828.

The invention claimed is:

1. A method for deriving a representation of an image by processing signals corresponding to the image, the method comprising:

processing the image to obtain a three dimensional representation of the image by
tracing lines across the image, each line across the image being defined by a first, distance, parameter (d) and a second, angle, parameter ($\theta$), wherein a position on each line is defined by a third, position, parameter (t); and
deriving a three dimensional representation of the image represented by said first, second, and third parameters (d, $\theta$, t) and the corresponding pixel value; and
using the three dimensional representation of the image to derive the representation of the image, by
extracting values of the three dimensional representation for a predetermined value of the first, distance, parameter, and
applying a functional along one or more lines of the extracted values of the three dimensional representation, each line extending along values of the second, angle, parameter at a corresponding, variable, value of the third, position, parameter (t), to obtain a one-dimensional function in terms of the third, position, parameter (t).

2. A method for deriving a representation of an image by processing signals corresponding to the image, the method comprising:

processing the image to obtain a three dimensional representation of the image by
tracing lines across the image, each line across the image being defined by a first, distance, parameter (d) and a second, angle, parameter ($\theta$), wherein a position on each line is defined by a third, position, parameter (t); and
deriving a three dimensional representation of the image represented by said first, second, and third parameters (d, $\theta$, t) and the corresponding pixel value; and
using the three dimensional representation of the image to derive the representation of the image, by
extracting values of the three dimensional representation for a predetermined value of the first, distance, parameter (d), and
applying a functional along one or more segments of lines of the extracted values, the line segments defined by an interval between predefined positions of the third, position, parameter (t), each line extending along fixed values of the third, position, parameter at a corresponding, variable, value of the second, angle, parameter (θ), to obtain a one-dimensional function in terms of the second, angle, parameter (θ).

3. A method as claimed in claim 1 or 2, comprising:
extracting values of the three dimensional representation for a predetermined positive value of the first parameter to derive a first set of extracted values, and
extracting values of the three dimensional representation for a negative value of the first, distance, parameter (d) equivalent to the predetermined positive value, to derive a second set of extracted values.

4. A method as claimed in claim 3, further comprising:
applying a functional along lines of each of the first and second sets of extracted values to derive respective first and second functions, and
combining the first and second functions.

5. A method as claimed in claim 1 or 2, further comprising:
using the one dimensional function to derive a binary representation of the image.

6. A method as claimed in claim 1 or 2, comprising using the magnitudes of frequency components to derive a representation of the image.

7. A method as claimed in claim 6, wherein the frequency components are determined using a Fourier transform or a Haar transform.

8. A method as claimed in claim 6, wherein the step of using the magnitudes of frequency components, comprises the steps of:
calculating the magnitude of a plurality of frequency coefficients, and
determining a difference between the magnitude of each coefficient and its subsequent coefficient.

9. A method as claimed in claimed in claim 8, further comprising deriving a binary function by:
applying a threshold to each determined difference to derive a series of binary values, wherein applying the threshold provides a binary value of 0 if a said difference is less than a threshold value, and a binary value of 1 if a said difference is greater than or equal to the threshold value.

10. A method as claimed in claim 6, wherein the step of using the magnitudes of frequency components, comprises the steps of:
calculating the logarithm of the magnitude of a plurality of frequency coefficients, and
determining a difference between the logarithm of the magnitude of each coefficient and its subsequent coefficient.

11. A method as claimed in claim 1 or 2, comprising deriving a representation having n digits or bits, further comprising selecting a subset of m digits orbits.

12. A method as claimed in claim 11, wherein said combining comprises concatenating said two or more representations.

13. A method as claimed in claim 1 or 2, comprising deriving a plurality of representations of the image by applying a plurality of different functionals along lines of the three dimensional representation, and combining two or more of said plurality of representations.

14. A method for identifying or comparing an image using a method as claimed in claim 1 or claim 2.

15. A method of identifying an image comprising deriving a representation of the image using the method of claim 1 or claim 2 and associating the representation with the image.

16. A method of comparing images comprising comparing representations of each image derived using the method of claim 1 or claim 2.

17. The method of claim 16 wherein the comparison comprises determining a Hamming distance using the equation:

$$H(B_1, B_2) = \frac{1}{N}\sum_N B_1 \otimes B_2$$

where ⊗ is the exclusive OR (XOR) operator, and N is the length of identifiers $B_1$ and $B_2$.

18. The method of claim 16 comprising selecting images based on the comparison of representations.

19. A method of transmitting or receiving a representation derived using the method of claim 1 or 2.

20. Apparatus for deriving a representation of an image by processing signals corresponding to the image, the apparatus comprising:
a database having one or more images stored therein; and
a processor configured to execute executing the method of claim 1 or claim 2.

21. Apparatus as claimed in claim 20, further comprising:
a descriptor database, a display means, and an image selecting means.

22. A non-transitory computer readable medium having stored there on a computer executable program for executing the method of claim 1 or 2.

23. A method as claimed in claim 1 or 2, comprising:
extracting values of the three dimensional representation for the first parameter equal to zero.

* * * * *